United States Patent [19]

Parrott

[11] Patent Number: 4,510,046

[45] Date of Patent: Apr. 9, 1985

[54] CATALYTIC HYDRODENITROGENATION OF ORGANIC COMPOUNDS

[76] Inventor: Stephen L. Parrott, c/o Phillips Petroleum Company, Bartlesville, Okla. 74004

[21] Appl. No.: 558,651

[22] Filed: Dec. 6, 1983

[51] Int. Cl.³ .................... C10G 45/04; C10G 45/10
[52] U.S. Cl. ........................ 208/254 H; 208/213; 208/217
[58] Field of Search ............... 208/254 H, 208 R, 209, 208/213, 217

[56] References Cited

U.S. PATENT DOCUMENTS

| | | | |
|---|---|---|---|
| 3,256,178 | 6/1966 | Hass et al. | 208/254 H |
| 3,409,539 | 11/1968 | Paterson | 208/111 |
| 3,592,760 | 7/1971 | Young | 208/254 H |
| 3,943,051 | 3/1976 | Ward | 208/254 H |
| 4,057,489 | 11/1977 | Montagna et al. | 208/111 |
| 4,128,505 | 12/1978 | Mikovsky et al. | 208/254 H |
| 4,251,350 | 2/1981 | Johnson et al. | 208/254 H |
| 4,469,590 | 9/1984 | Schucker et al. | 208/89 |

*Primary Examiner*—Delbert E. Gantz
*Assistant Examiner*—Anthony McFarlane

[57] ABSTRACT

The catalytic hydrodenitrogenation of an organic nitrogen compound is carried out in the presence of a catalyst composition comprising platinum, titanium and a support.

7 Claims, No Drawings

CATALYTIC HYDRODENITROGENATION OF ORGANIC COMPOUNDS

This invention relates to an improved catalytic process for the hydrodenitrogenation (HDN) of organic nitrogen compounds and a catalyst therefor.

Hydrodenitrogenation is a process intended primarily to convert the nitrogen in organic nitrogen compounds to ammonia. Ammonia can be removed from the feed stream after the hydrodenitrogenation process. Hydrodenitrogenation is a process which is typically utilized to remove nitrogen from a hydrocarbon-containing feedstock which contains organic nitrogen compounds to produce fuels which, when burned, will meet environmental standards. The process may be applied to feed streams other than hydrocarbon-containing feeds if organic nitrogen compounds are present and the removal of nitrogen is desired.

It is an object of this invention to provide a hydrodenitrogenation catalyst which exhibits high activity to thus provide an improved process for the hydrodenitrogenation of organic compounds.

In accordance with the present invention, a catalyst composition consisting essentially of platinum, titanium and a support is used in a hydrodenitrogenation process. The hydrodenitrogenation process is carried out under suitable conditions. The catalyst composition exhibits substantial activity for hydrodenitrogenation.

The hydrodenitrogenation process is preferably carried out in cycles consisting of a reaction period and a regeneration period for the catalyst. The reaction period comprises contacting a feedstock which contains organic nitrogen compounds with the catalyst to thereby convert the nitrogen in organic nitrogen compounds to ammonia. After the reaction period, an oxygen-containing gas is passed in contact with the catalyst to regenerate the catalyst by burning off carbonaceous materials which may have formed on the catalyst.

Other objects and advantages of the invention will be apparent from the foregoing brief description of the invention and the appended claims, as well as the detailed description of the invention which follows.

Any suitable organic nitrogen compound may be hydrodenitrogenized in accordance with the present invention. Suitable organic nitrogen compounds include amines, diamines, pyridines, quinolines, porphyrins, benzoquinolines and the like and mixtures of two or more thereof.

Organic nitrogen compounds contained in any suitable fluid stream may be hydrodenitrogenized in accordance with the present invention. Suitable fluid streams include light hydrocarbons such as methane, ethane, ethylene and natural gas, gases such as hydrogen and nitrogen, gaseous oxides of carbon, steam, and the inert gases such as helium and argon.

The invention is particularly directed to hydrocarbon-containing feed streams which also contain organic nitrogen compounds. Suitable hydrocarbon-containing feeds include not only those hydrocarbon-containing feeds previously mentioned but also petroleum products and products from extraction and/or liquefaction of coal and lignite, products from tar sands, products from shale oil and similar products. Suitable hydrocarbons include naphtha, distillates, gas oil having a boiling range from about 205° to about 538° C., topped crude having a boiling range in excess of about 343° C. and residuum. Since shale oil and products from shale oil generally contain high concentrations of nitrogen, the invention is particularly applicable to the hydrodenitrogenation of shale oil and products from shale oil.

The catalyst composition is effective for the removal of nitrogen in the absence of sulfur in the feed. However, it is believed that the catalyst composition would be too active in the absence of sulfur and would hydrogenate not only nitrogen compounds but also olefins and aromatics resulting in excessive hydrogen consumption. Sulfur in the feed is believed to poison the platinum in the catalyst to some extent making the catalyst less active but also more selective towards the hydrogenation of nitrogen compounds. Thus, the feed will preferably contain sulfur compounds.

The hydrodenitrogenation catalyst employed in the process of the present invention consists essentially of a support, platinum and titanium. The titanium is generally present in the catalyst in the oxide form, whereas the platinum is in the elemental form.

Any suitable total concentration of platinum may be utilized. The total concentration of platinum, expressed as an element, will generally be in the range of about 0.1 to 10 weight percent based on the weight of the catalyst composition and will preferably be in the range of about 0.5 to about 4 weight percent based on the weight of the catalyst composition.

Any suitable concentration of titanium may be utilized in the catalyst composition. The concentration of titanium, expressed as titanium dioxide, will generally be in the range of about 0.1 to about 30 weight percent based on the weight of the catalyst composition and will preferably be in the range of about 2 to about 20 weight percent based on the weight of the catalyst composition.

Any suitable support may be utilized in the catalyst composition. Suitable supports include aluminas, silica aluminas and zeolites. A high purity gamma alumina is the preferred support because this support yields the most active catalyst.

Either the elemental form of the promoters or any suitable compound of the promoters may be utilized to form the catalyst composition.

Platinum compounds suitable for use in preparing the catalyst composition are $PtCl_2$, $PtCl_4$, $H_2PtCl_6$, $PtBr_4$, $PtI_4$, $[Pt(NH_3)_4]Cl_2$ and $[PtCl_2(NH_3)_2]$. $H_2PtCl_6$ is the preferred platinum compound.

Titanium compounds suitable for use in preparing the catalyst composition are those directly convertible to titanium dioxide when being calcined. Examples of suitable titanium compounds are titanium alkoxides $(Ti(OR)_4)$ where R is an alkyl group having from 1-6 carbon atoms; and titanium salts of organic acids such as titanium oxalate and titanium citrate.

The catalyst composition may be prepared by any method known to the art. Preferably, the titanium compound is added to a high purity gamma alumina support by impregnating the alumina with a solution—aqueous or organic—that contains the titanium compound. After the titanium compound has been added to the alumina, the alumina is dried and is then preferably calcined in air at a temperature in the range of about 500° C. to about 700° C. to convert the titanium to titanium dioxide. The platinum is then added by the same impregnation process. The resulting catalyst is then again dried and calcined in the air at a temperature in the range of about 500° C. to about 600° C. to form the hydrogenation catalyst of the present invention.

It is noted that the platinum and titanium may both be added to the alumina prior to the calcining step. However, it is preferred to add the titanium compound first and calcine the alumina which has been impregnated with only the titanium to enable the titanium dioxide to coat the $Al_2O_3$ as completely as possible so that $TiO_2$ can interact with the subsequently added platinum compound.

The process of this invention can be carried out by means of any apparatus whereby there is achieved a contact with the catalyst of the organic compounds to be hydrodenitrogenized. The process is in no way limited to the use of a particular apparatus. The process of this invention can be carried out using a fixed catalyst bed, fluidized catalyst bed, or moving catalyst bed. Presently preferred is a fixed catalyst bed.

In order to avoid any casual mixing of the feed stream containing the organic nitrogen compound and the oxygen-containing fluid utilized in the regeneration step, provision is preferably made for terminating the flow of feed to the reactor and injecting an inert purging fluid such as nitrogen, carbon dioxide or steam. Any suitable purge time can be utilized. The purge duration will be of sufficient length to completely remove hydrogen and hydrocarbons. Any suitable flow rate of the purge fluid may be utilized. Presently preferred is a purge fluid flow rate in the range of about 800 GHSV to about 1200 GHSV.

Any suitable temperature for hydrodenitrogenation of the organic nitrogen compounds over the catalyst composition of the present invention can be utilized. The temperature will generally be in a range of about 205° C. to about 538° C. and will more preferably be in the range of about 316° C. to about 427° C. for the hydrodenitrogenation process.

Any suitable pressure for the hydrodenitrogenation of the organic nitrogen compounds over the catalyst composition of the present invention can be utilized. In general, the pressure will be in the range of about 200 to about 3000 psig total system pressure for the hydrodenitrogenation process. The total system pressure is the sum of the partial pressure of the feedstock plus the partial pressure of the added hydrogen. Preferably the total system pressure will range from about 500 to about 2000 psig for the hydrodenitrogenation process.

Any suitable quantity of hydrogen can be added to the hydrodenitrogenation process. The quantity of hydrogen used to contact the feedstock containing the organic compounds being hydrodenitrogenized will be in the range from about 100 to about 10,000 SCF/bbl and will more preferably be in the range from about 500 to about 3000 SCF/bbl.

Any suitable residence time for the feedstock in the presence of the catalyst composition of the present invention can be utilized. In general, the residence time in terms of the volumes of liquid per volume of catalyst per hour (LHSV) can range from about 0.1 to about 20 and will more preferably range from about 0.5 to about 5 for the hydrodenitrogenation process.

To maintain the activity of the hydrodenitrogenation catalyst, the temperature of the hydrodenitrogenation process is gradually increased to compensate for loss of catalyst activity due to fouling of the catalyst. When the temperature of the hydrodenitrogenation process cannot conveniently be increased further, the catalyst is typically regenerated by terminating the flow of feed to the reactor, purging with an inert fluid such as nitrogen to remove combustibles and then introducing free oxygen-containing fluid to oxidize the carbonaceous deposits which have formed on the catalyst during the hydrodenitrogenation process. The catalyst will generally be utilized for a year or longer before being regenerated.

The amount of oxygen, from any source, supplied during the regeneration step will be in an amount sufficient to remove carbonaceous materials from the catalyst. The regeneration step is conducted at generally the same pressure recited for the hydrodenitrogenation step. The temperature for the regeneration step is preferably maintained in the range of about 425° C. to about 650° C. If the hydrodenitrogenation process has been proceeding at a temperature lower than 425° C., the temperature of the catalyst should be increased to about 425° C. prior to the start of the regeneration of the catalyst in order to remove any carbonaceous deposits on the catalyst within a reasonable time.

The following example is presented in further illustration of the invention.

EXAMPLE

A catalyst that illustrates the improvement of this invention was prepared as follows: 15.0 g of $-20+40$ mesh catalyst grade activated alumina (surface area, by $BET/N_2$: 293 $m^2/g$; pore volume, by $BET/N_2$: 0.84 $cm^2/g$; mean pore diameter: 106 Å; supplied by Catalyst and Chemical Industries, Ltd., Kita Kysuhu, Japan) that had been dried in a vacuum of less than 1 mm. Hg for 30 minutes at 150° C. was placed in a vacuum flask fitted with a separating funnel. The flask was then evacuated to a pressure of less than 1 mm. Hg and 17 mL of solution of titanium citrate (1.71 g $TiO_2$) was dripped onto the alumina. After one hour the vacuum was released. The resulting catalyst was dried under a heat lamp and then calcined in air in a muffle furnace that was programmed to increase heat at 11° F. per minute to 1000° F. The furnace remained at 1000° F. for two hours. After cooling, the catalyst was returned to the vacuum flask. After evacuation, 15 mL of aqueous solution containing 0.850 g of $H_2PtCl_6.xH_2O$ with 0.40 weight percent Pt content (0.34 g Pt) was added. The vacuum was released and the catalyst was dried and placed in a quartz tube under flowing hydrogen to reduce the platinum compound. The catalyst was finally calcined in air at 1000° F. for three hours. The calculated composition of this catalyst (referred to hereinafter as Catalyst A) was 2.00 weight percent platinum, 10.00 weight percent titania, balance alumina.

Catalyst B was prepared from the same kind of alumina but contained only platinum—no titania. Catalyst B was made by adding 15 mL of aqueous solution containing 0.763 g $H_2PtCl_6.xH_2O$ with 0.40 weight percent Pt (0.3 g Pt) to 15.0 g evacuated alumina, then drying and treating as described above for the preparation after platinum had been added. This control catalyst (referred to hereinafter as Catalyst B) contained 2.00 weight percent platinum by calculation.

Catalysts A and B were used in runs to hydrotreat a light cycle oil having an API gravity of 20.3°, a boiling range of about 400°–650° F., and containing 1.34 weight percent sulfur and 184 ppm (wt) nitrogen. Runs were made with 6.25 mL of catalyst diluted with 18.75 mL of inert Aluindum ($Al_2O_3$) placed in a stainless steel tubular reactor mounted vertically in a temperature controlled tube furnace. Before the catalysts were used they were exposed for 1-2 hours at 521°–621° C. to hydrogen at 650 psig and a hydrogen flow rate of 1

SCF/hr in a quartz tube. Hydrogenation runs employing these hydrogen-heated catalysts were made at 371° C., 650 psig pressure, hydrogen:oil feed rates of 2000 SCF $H_2$/bbl, and an oil feed rate of 4 LHSV. Product samples were accumulated for various times and then analyzed for sulfur by X-ray fluorescence spectrometry. Nitrogen content was determined by chemiluminescence, wherein the product was combusted and then reacted with ozone. The following table contains these times and pertinent results of the analyses.

TABLE I

|  | Catalyst A | | | Catalyst B | |
| --- | --- | --- | --- | --- | --- |
| Run | 1 | 2 | 3 | 4 | 5 |
| Collecting time, hours | 3.3 | 15.5 | 8.8 | 16.4 | 6.8 |
| °API at 60° F. | 23.2 | 23.0 | 22.7 | 22.0 | 21.9 |
| $H_2$ consumed, SCF/bbl | 330 | 313 | 292 | 189 | 182 |
| Sulfur, wt. % | 0.41 | 0.44 | 0.47 | 0.62 | 0.62 |
| Nitrogen, ppm (wt.) | 16 | 27 | 32 | 127 | 138 |

Catalyst A, which contained titanium dioxide, was more active than Catalyst B in removing both sulfur and nitrogen from the feedstock. In runs 1–3 sulfur removal ranged from 69–65%; in runs 4 and 5 sulfur removal was 54%. In runs 1–3 nitrogen removal range from 91–83%; in runs 4 and 5 nitrogen removal was 31–25%. The selectivity of Catalyst A to remove a larger fraction of nitrogen than of sulfur from the cycle oil is particularly unexpected.

To further demonstrate the selective nature of the invention catalyst, a separate test was run with a commercial NiMo/$Al_2O_3$ catalyst, Nalco NM-506. Process conditions were 400 psi, 3 LHSV, and 630° F. Under these conditions, the commercial catalyst had about the same nitrogen removal activity as the invention catalyst but the hydrogen consumption was more than 2 times higher.

Reasonable variations and modifications are possible within the scope of the disclosure and the appended claims to the invention.

That which is claimed:

1. A process for the catalytic hydrodenitrogenation of an organic nitrogen compound comprising the step of contacting said organic nitrogen compound under suitable hydrodenitrogenation conditions with a catalyst composition consisting essentially of platinum, titanium and a of high purity gamma alumina support.

2. A process in accordance with claim 1 wherein said organic nitrogen compound is selected from the group consisting of amines, diamines, pyridines, quinolines, porphyrins and benzoquinolines.

3. A process in accordance with claim 1 wherein the total concentration of platinum in said catalyst composition is in the range of about 0.1 to about 10 weight percent based on the weight of said catalyst composition and wherein the concentration of titanium in said catalyst composition, expressed as titanium dioxide, is in the range of about 0.1 weight percent to about 30 weight percent based on the weight of said catalyst composition.

4. A process in accordance with claim 1 wherein the concentration of platinum in said catalyst composition is in the range of about 0.5 to about 4 weight percent based on the weight of said catalyst composition and wherein the concentration of titanium in said catalyst composition is in the range of about 2 to about 20 weight percent based on the weight of said catalyst composition.

5. A process in accordance with claim 1 wherein said organic nitrogen compound is contained in a fluid feed stream.

6. A process in accordance with claim 5 wherein said suitable hydrodenitrogenation conditions comprise a temperature in the range of about 205° C. to about 538° C., a total system pressure in the range of about 200 psig to about 3000 psig, a hydrogen flow rate in the range of about 100 to about 10,000 SCF/bbl and a residence time for said fluid stream in the presence of said catalyst composition in the range of about 0.1 to about 20 liquid volumes of said fluid feed stream per volume of said catalyst composition per hour.

7. A process in accordance with claim 5 wherein said suitable hydrodenitrogenation conditions comprise a temperature in the range of about 315° C. to about 427° C., a total system pressure in the range from about 500 psig to about 2000 psig, a hydrogen flow rate in the range of about 500 to about 3000 SCF/bbl. and a residence time for said fluid feed stream in the presence of said catalyst composition in the range from about 0.5 to about 5 liquid volumes of said fluid feed stream per volume of said catalyst composition per hour.

* * * * *